United States Patent [19]

Nagamoto et al.

[11] Patent Number: 4,714,577
[45] Date of Patent: Dec. 22, 1987

[54] METHOD FOR PRODUCING A WOOD-TYPE GOLF CLUB HEAD

[75] Inventors: Itsushi Nagamoto; Tatsuo Nakanishi; Ryohei Tajima, all of Hamamatsu, Japan

[73] Assignee: Nippon Gakki Seizo Kabushiki Kaisha, Japan

[21] Appl. No.: 905,952

[22] Filed: Sep. 11, 1986

[30] Foreign Application Priority Data

Dec. 20, 1985 [JP] Japan ................................ 60-287193

[51] Int. Cl.⁴ ............................................. B29C 67/00
[52] U.S. Cl. .................... 264/46.6; 144/329; 273/167 H; 428/71; 428/76
[58] Field of Search .................. 264/46.6; 428/71, 76; 273/167 H; 144/329

[56] References Cited

U.S. PATENT DOCUMENTS

| 3,864,206 | 2/1975 | Linderoth | 264/46.6 |
| 4,432,549 | 2/1984 | Zebelean | 273/167 H |
| 4,451,042 | 5/1984 | Hayashi et al. | 273/167 H |
| 4,489,945 | 12/1984 | Kobayashi | 273/167 H |
| 4,614,627 | 9/1986 | Curtis et al. | 264/46.6 |

Primary Examiner—W. D. Bray
Attorney, Agent, or Firm—Lerner, David, Littenberg, Krumholz & Mentlik

[57] ABSTRACT

In production of a wood-type golf club head having a rigid shell, metal pieces are dispersed in the matrix of crude foamable synthetic resin filled in the interior of a crude rigid shell for long maintenance in position of the center of gravity of the product despite shocks at shooting balls.

14 Claims, 4 Drawing Figures

METHOD FOR PRODUCING A WOOD-TYPE GOLF CLUB HEAD

BACKGROUND OF THE INVENTION

The present invention relates to an improved method for producing a wood-type golf club head, and more particularly relates to an improvement in production of a wood-type golf club head having a shell made of FRP (fiber reinforced plastics) or metal.

Japanese Patent Publication No. sho.51-21436 discloses one conventional example of such a wood-type golf club head. The golf club head includes a hollow FRP shell whose cavity is filled with foam resin. Such a structure, however, does not allow successful weight balance adjustment.

In the case of a solid golf club head made of wood, weight balance adjustment is well carried out by forming one or more holes in the body and filling corresponding number of mass pieces into the holes. Such a manner of weight balance adjustment is accompanied with no significant problems.

This, however, cannot be said for the above-described type of golf club head having a hollow shell. In this case, a threaded hole is formed in the shell and a mass piece is screwed directly into the threaded hole. This mechanism basically depends on the thread engagement for fixation of the mass piece for weight balance adjustment. This thread engagement, however, is quite unreliable due to the relatively small thickness of the shell and the fixation is poorly endurable against shocks at shooting balls. Thus, loose attachment of the mass piece tends to allow undesirable displacement of the mass piece, and in the worst case separation of the mass piece, thereby seriously disturbing balance of weight of the golf club head.

SUMMARY OF THE INVENTION

It is the object of the present invention to assure stabilized balance of weight of a wood-type golf club head via fortified attachment of mass pieces to its main body.

In accordance with the present invention, a lid having a threaded hole is set to a bottom seat hole in a hollow crude shell of a crude golf club head, liquid or granular crude foamable synthetic resin of a prescribed amount with metal pieces is filled into the interior of the hollow crude shell via the threaded hole in the lid and the crude golf club head is heated for foaming.

DESCRIPTION OF THE PREFERRED EMBODIMENTS

Figure 1:
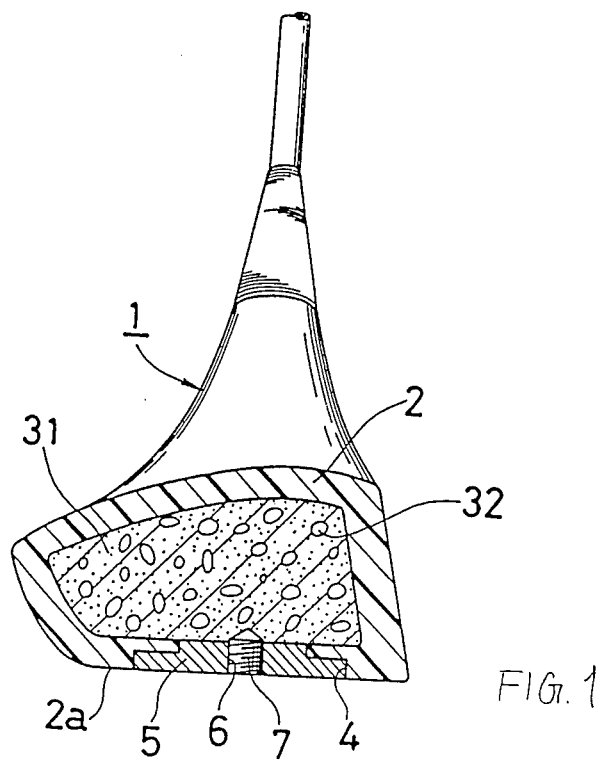
FIG. 1 is a side sectional view of one example of the wood-type golf club head produced in accordance with the method of the present invention.

One example of the wood-type golf club head produced in accordance with the present invention is shown in FIG. 1. The golf club head 1 includes a FRP shell 2, a foam resin core 31 filled in the interior of the FRP shell 2, metal pieces 32 dispersed in the foam resin core 31, a lid 5 placed in a seat hole 4 formed in the bottom 2a of the FRP shell 2 and a plug 7 screwed into a center threaded hole 6 in the lid 5.

Figure 2:
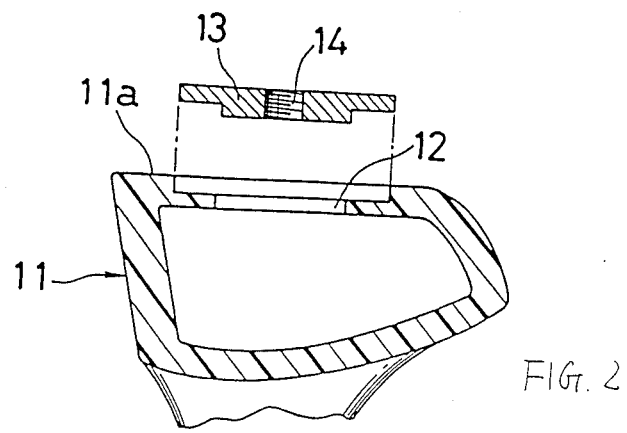
FIGS. 2 through 4 are side sectional views of the sequential steps of the method in accordance with the present invention.
Figure 3:
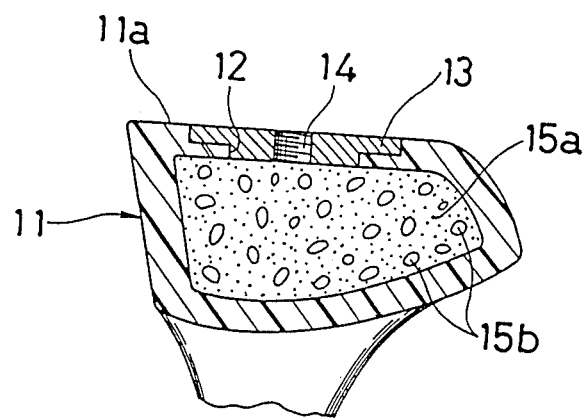
Figure 4:
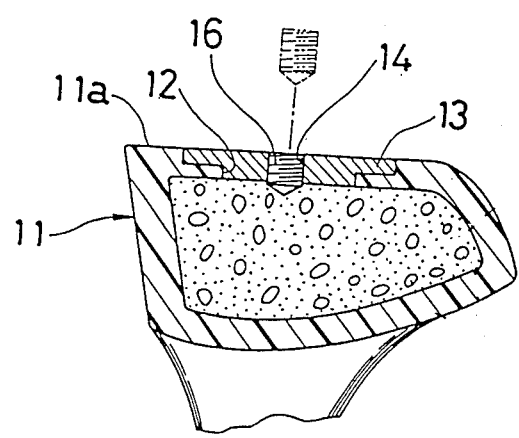

Such a golf club head is produced by, for example, the method including steps shown in FIGS. 2 through 4.

First a hollow crude FRP shell 11 is prepared by heat pressing, injection molding or other suitable shaping process. During or after the shaping, a seat hole 12 is formed in the bottom 11a (sole side) of the crude FRP shell 11 as shown in FIG. 2. A lid 13 made of metal and having a center threaded hole 14 is set and fixed in the seat hole 13 in the crude FRP shell 11. The position of the threaded hole 14 in the lid 13 should correspond to the premeditated position of the center of gravity of the golf club head 1 shown in FIG. 1.

Next, as shown in FIG. 3, granular crude foamable synthetic resin 15a, such as polystyrene beads, of a prescribed amount with metal pieces 15b is filled into the interior of the crude FRP shell 11 via the threaded hole 14 in the lid 13.

Finally, as shown in FIG. 4, the threaded hole 14 in the lid 13 is closed by a plug 16 via screw engagement and the crude golf club head is subjected to heating to develop foaming of the crude foamable synthetic resin 15a. As a result, the interior of the FRP shell is fully and uniformly filled with the foam resin as shown in FIG. 1.

Heating of the crude golf club head may be carried out either after or before filling of the crude foamable synthetic resin. The metal pieces may be added either before or after filling of the crude foamable synthetic resin. Further, the plug 16 may be applied either before or after foaming of the crude foamable synthetic resin. In connection with this choice, granular crude foamable synthetic resin is preferably used for plug application after foaming inasmuch as no overflow via the open threaded hole is caused by foaming due to relatively low fluidity. The volume of the crude shell 11 should preferably be in a range from 20 to 90 cm$^3$. The apparent specific gravity of the foamable synthetic resin should preferably be in a range from 0.05 to 0.45 when no filler is used, and from 0.05 to 1.5 when filler is used. Powdery barium sulfate and alumina are advantageously used for the filler.

As the foamable synthetic resin, thermoplastic synthetic resin such as polystyrene beads without primary foaming, and thermosetting synthetic resin such as unhardened liquid polyurethane are usable. When polystyrene beads are used, the metal pieces are mixed with the beads so that the mixture is heated together in the interior of the crude shell at, for example, 120° C. for 20 min. When unhardened liquid polyurethane is used, the metal pieces are first placed in the interior of the crude shell for subsequent filling of polyurethane.

The metal pieces are preferably made of lead and take the form of balls or cylinders of 3 mm diameter and 5 to 10 mm length.

The seat hole in the crude shell may be formed either during or after shaping of the crude shell.

In accordance with the present invention, the metal pieces can be dispersed either uniformly or locally in the matrix of the foam resin core thereby allowing free weight balance adjustment. In addition, these metal pieces are firmly embraced by the matrix of the foam resin core thereby allowing no disturbance of the weight balance. Shocks at shooting balls has no substantial influence on positional fixation of the metal pieces.

We claim:

1. An improved method for producing a wood-type golf club head comprising the steps of setting a lid having a threaded hole to a bottom seat hole in a hollow crude shell of a crude golf club head, filling crude foamable synthetic resin of a prescribed amount with metal pieces into the interior of said hollow crude shell via said threaded hole in said lid, and heating said crude golf club head for foaming.

2. An improved method as claimed in claim 1 in which said threaded hole in said lid is closed before heating said crude golf club head.

3. An improved method as claimed in claim 1 in which said threaded hole in said lid is closed after heating said crude golf club head.

4. An improved method as claimed in claim 1 in which liquid crude foamable synthetic resin is used.

5. An improved method as claimed in claim 1 in which granular crude foamable synthetic resin is used.

6. An improved method as claimed in claim 1 in which the volume of said crude shell is in a range from 20 to 90 cm$^3$.

7. An improved method as claimed in claim 1 in which filler is not used and the apparent specific gravity of said crude foamable synthetic resin is in a range from 0.05 to 0.45.

8. An improved method as claimed in claim 1 in which filler is used and the apparent specific gravity of said crude foamable synthetic resin is in a range from 0.05 to 1.5.

9. An improved method as claimed in claim 8 in which said filler is taken from a group consisting of barium sulfate and alumina.

10. An improved method as claimed in claim 1 in which said metal pieces are cylindrical in shape.

11. An improved method as claimed in claim 1 in which said metal pieces are spherical in shape.

12. An improved method as claimed in claim 10 in which said metal pieces have a diameter of about 3 mm and a length of from about 5 to 10 mm.

13. An improved method as claimed in claim 11 in which said metal pieces have a diameter of about 3 mm.

14. An improved method as claimed in claim 1 in which said filling of crude foamable synthetic resin into the interior of said hollow crude shell is via said threaded hole which is arranged at a location corresponding to the position of the center of gravity of said golf club head.

* * * * *